US006430268B1

(12) United States Patent
Petite

(10) Patent No.: US 6,430,268 B1
(45) Date of Patent: *Aug. 6, 2002

(54) SYSTEMS FOR REQUESTING SERVICE OF A VENDING MACHINE

(75) Inventor: Thomas D. Petite, Douglasville, GA (US)

(73) Assignee: StatSignal Systems, Inc., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/102,178

(22) Filed: Jun. 22, 1998

Related U.S. Application Data

(60) Provisional application No. 60/059,643, filed on Sep. 20, 1997.

(51) Int. Cl.[7] .......................... H04M 11/04; H04M 11/00
(52) U.S. Cl. ........................ 379/39; 379/40; 379/90.01; 379/93.12
(58) Field of Search ................ 379/90.01, 91.01–91.02, 379/93.05, 93.08, 93.12–93.15, 93.22, 106.01, 110.01, 39–40; 455/31.3, 38.3, 412, 414, 426, 466, 553, 557, 566, 455–456, 41; 705/28; 235/385; 364/479.01, 479.11–479.14; 340/5.22, 5.9

(56) References Cited

U.S. PATENT DOCUMENTS

| | | | |
|---|---|---|---|
| 3,906,460 A | 9/1975 | Halpern | 340/172 |
| 4,120,452 A | 10/1978 | Kimura et al. | 235/381 |
| 4,605,844 A | 8/1986 | Haggan | 235/380 |
| 4,631,357 A | * 12/1986 | Grunig | 379/106.01 |
| 4,757,185 A | 7/1988 | Onishi | 235/379 |
| 4,800,543 A | 1/1989 | Lyndon-James et al. | 368/10 |
| 4,851,654 A | 7/1989 | Nitta | 235/492 |
| 4,897,644 A | 1/1990 | Hirano | 340/825 |
| 4,906,828 A | 3/1990 | Halpern | 235/379 |
| 4,972,504 A | * 11/1990 | Daniel, Jr. et al. | 455/41 |
| 4,991,008 A | 2/1991 | Nama | 358/108 |
| 5,113,183 A | 5/1992 | Katayama | 340/825 |

(List continued on next page.)

Primary Examiner—Duc Nguyen
Assistant Examiner—George Eng
(74) Attorney, Agent, or Firm—Thomas, Kayden, Horstemeyer & Risley

(57) ABSTRACT

The present invention is generally directed to an automated system for requesting service of a vending machine. In accordance with one aspect of the invention, the system includes a set of sensors configured to detect a variety of service conditions, including products being low or out of stock, as well as out of order conditions. The sensors generate output signals that are input to a transmitter disposed at (typically within) the vending machine. The transmitter includes circuitry that encodes the signals received from the sensors into a message that includes an instruction code. The transmitter further includes circuitry for transmitting the encoded message, preferably via radio frequency transmission (although other forms of transmission are consistent with the invention). The system further includes a transceiver located remotely (but nearby) from the transmitter, and configured to receive the transmitted signal. The transceiver includes circuitry for accessing the public switched telephone network and circuitry for controlling the transceiver to dial a defined telephone number. The transceiver further includes circuitry that, after the connection is established, controls the transmission of the encoded message to the central station. Accordingly, the central station includes an interface to the PSTN and circuitry configured to receive the encoded message transmitted from the transceiver. The central station further includes circuitry (which may be programmable —e.g., in the form of a computer) that evaluates the encoded message, and from that evaluation determines the state of the vending machine sensors.

24 Claims, 8 Drawing Sheets

U.S. PATENT DOCUMENTS

| | | | |
|---|---|---|---|
| 5,130,519 A | 7/1992 | Bush et al. | 235/380 |
| 5,191,192 A | 3/1993 | Takahira et al. | 235/375 |
| 5,216,502 A | 6/1993 | Katz | 358/108 |
| 5,235,630 A | 8/1993 | Moody et al. | 379/37 |
| 5,253,167 A | 10/1993 | Yoshida et al. | 364/408 |
| 5,265,162 A | 11/1993 | Bush et al. | 380/24 |
| 5,266,782 A | 11/1993 | Alanara et al. | 235/380 |
| 5,305,370 A | 4/1994 | Kearns et al. | 379/45 |
| 5,315,645 A | 5/1994 | Matheny | 379/144 |
| 5,317,309 A | 5/1994 | Vercellotti et al. | 340/825 |
| 5,319,364 A | 6/1994 | Waraksa et al. | 340/825 |
| 5,319,711 A | 6/1994 | Servi | 380/23 |
| 5,345,231 A | 9/1994 | Koo et al. | 340/870 |
| 5,347,263 A | 9/1994 | Carroll et al. | 340/572 |
| 5,354,974 A | 10/1994 | Eisenberg | 235/379 |
| 5,382,778 A | 1/1995 | Takahira et al. | 235/380 |
| 5,445,287 A | 8/1995 | Center et al. | 221/1 |
| 5,467,082 A | 11/1995 | Sanderson | 340/825 |
| 5,484,997 A | 1/1996 | Haynes | 235/492 |
| 5,517,188 A | 5/1996 | Carroll et al. | 340/825 |
| 5,548,632 A | 8/1996 | Walsh et al. | 379/58 |
| 5,550,359 A | 8/1996 | Bennett | 235/382 |
| 5,550,535 A | 8/1996 | Park | 340/825 |
| 5,565,857 A | 10/1996 | Lee | 340/825 |
| 5,606,361 A * | 2/1997 | Davidsohn et al. | 348/14 |
| 5,629,687 A * | 5/1997 | Sutton et al. | 379/106.01 |
| 5,699,328 A | 12/1997 | Ishizaki et al. | 369/24 |
| 5,704,517 A | 1/1998 | Lancaster et al. | 222/222 |
| 5,706,976 A | 1/1998 | Purkey et al. | 221/6 |
| 5,708,223 A | 1/1998 | Wyss | 73/865.9 |
| 5,740,232 A | 4/1998 | Pailes et al. | 379/93.02 |
| 5,748,104 A * | 5/1998 | Argyroudis et al. | 379/106.01 |
| 5,826,195 A * | 10/1998 | Westerlage et al. | 455/456 |
| 5,844,808 A * | 12/1998 | Konsmo et al. | 364/479.14 |
| 5,941,363 A * | 8/1999 | Partyka et al. | 364/479.06 |
| 5,997,170 A * | 12/1999 | Brodbeck | 364/479.06 |

* cited by examiner

| Instruction Code | Function |
|---|---|
| 00000001 | Vending machine n is low on product X |
| 00000002 | Vending machine n is out of product X |
| 00000003 | Vending machine n is low on product Y |
| 00000004 | Vending machine n is out of product Y |
| 00000005 | Vending machine is out of order |
| ... | ... |
| 00100101 | Vending machine n is tilted |
| ... | ... |
| 00111101 | Vending machine n is out of change |
| ... | ... |
| 10011001 | Vending machine m is out of change |

SYSTEMS FOR REQUESTING SERVICE OF A VENDING MACHINE

CROSS-REFERENCE TO RELATED APPLICATIONS

This application claims the benefit of U.S. provisional patent application Ser. No. 60/059,643, filed Sep. 20, 1997, and entitled System For Requesting Service Of A Vending Machine.

BACKGROUND OF THE INVENTION

1. Field of the Invention

The present invention generally relates to vending machines, and more particularly to a system that provides for automatic service requesting of a vending machine.

2. Discussion of the Related Art

As is known, there are a wide variety of vending machines, including those that dispense soft drinks, juices, snacks, cigarettes, candy, etc. In accordance with the general operation of these devices, a patron inserts money into a machine and the machine dispenses some sort of product. In addition to the items listed above, additional products may include ice cream, tickets, tokens, money (e.g., money changers), etc. For purposes of this application, the term "vending machine" is to be accorded a broad definition. In this regard, vending machines include, but are not limited to, machines that typically accept currency (either in the form of cash or credit cards), and dispenses some sort of product. Vending machines, however, within the scope of the term as used herein, need not require direct payment into the machine, but may simply be a machine that dispenses an article of inventory.

A variety of problems are known to cause vending machines to become inoperable (at least temporarily). For example, the machine may run out of one or more products, it may run out of change, or other problems may arise. Typically, these problems are addressed by sending a person to periodically restock the machines, or check them for proper functionality. However, this method encounters additional costs since the machines may not need restocking or servicing. At other times, the machines have been out of order or out of stock for some period of time before this condition is observed in the periodic restock or service run. Indeed, it is relatively expensive to employ an individual to make these periodic status checks. Also, a machine may be disabled or otherwise in need of service for a undesirably lengthy period of time between service checks, before the service condition is noted and reported.

There are systems known in the prior art that address this general shortcoming. For example, U.S. Pat. No. 5,207,784 discloses an inventory control system for a vending machine. That patent discloses a system that maintains an accurate running count of products maintained with a vending machine, at any given time. This count, or inventory status, may be communicated to an inventory control center at any given time, via phone lines. As specifically disclosed in that patent, various vending machines are connected to an inventory control center by way of telephone lines. Although the patent does not specify whether the telephone lines are leased lines or whether they communicate to the control center through the public switched telephone network (PSTN). Nevertheless, the patent does teach specifically that the phone lines are directly connected to the vending machines (see FIG. 1 and related discussion), and that the communication is performed by a modem disposed within each vending machine.

While the system of the '784 patent eliminates the need for a person to periodically check the machine(s) to determine whether they need to be restocked, it nevertheless suffers from other shortcomings. Most notably, the system of the '784 patent requires a phone line to be run directly to the vending machine(s). This limits the placement/location of such machines to locations where phone lines (and taps) presently exist, or requires the added expense of paying a telephone service provider to run a phone line to the machine. Furthermore, the system of the '784 patent does not address the problem of system failure. That is, when the machine malfunctions (for any of a variety of reasons), this problem must be manually detected and reported to the vending machine owner (or management company) so that an appropriate repair technician may be dispatched to service the machine. Valuable time, and many sales, may be lost before the condition is noted and reported.

Another inventory control system is disclosed in U.S. Pat. No. 5,708,223. Specifically, the system disclosed in the '223 patent is a system for monitoring the inventory of ice in an ice dispensing machine (another type of vending machine —even though it may not require direct payment into the machine). The system detects a low threshold of product inventory and reports this to, for example, the supplier of the product. The patent specifically teaches that the manner of reporting may "be by phone over either ground lines or cellular telephony, or by satellite, by radio transmission, or by local network." The method of communication, however, is directly to the supplier. Furthermore, the system, like that disclosed in the '784 patent does not address equipment failure. Thus, a mechanical failure may be manually detected and reported.

Accordingly, it is desired to provide an apparatus and method that effectively addresses these and other shortcomings of the prior art.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to an automated system for requesting service of a vending machine. In accordance with one aspect of the invention, the system includes a set of sensors disposed within a vending machine. As is known, the sensors are configured to detect a variety of service conditions, including products being low or out of stock, as well as out of order conditions. The sensors generate output signals that are input to a transmitter disposed at (typically within) the vending machine. The transmitter includes circuitry that encodes the signals received from the sensors into a message that includes an instruction code. The transmitter further includes circuitry for transmitting the encoded message, preferably via radio frequency transmission (although other forms of transmission are consistent with the invention). The system further includes a transceiver located remotely (but nearby) from the transmitter, and configured to receive the transmitted signal. The transceiver includes circuitry for accessing the public switched telephone network and circuitry for controlling the transceiver to dial a defined telephone number. The foregoing circuitry operates to establish a connection with a central station (e.g., a dispatch station). The transceiver further includes circuitry that, after the connection is established, controls the transmission of the encoded message to the central station. In accordance with certain embodiments of the invention, the transceiver may also transmit additional, transceiver specific, information to the central station as well. Accordingly, the central station includes an interface to the PSTN and circuitry configured to receive the encoded message transmitted from the transceiver. The central station further includes circuitry (which may be programmable —e.g., in the form of a computer) that evaluates the encoded message, and from that evaluation determines the state of the vending machine sensors.

To illustrate the foregoing summary with an operational example, consider a vending machine that is running low on a particular product. A sensor within the vending machine may make this determination and signal the transmitter accordingly. The transmitter then broadcasts a transmission that includes an instruction code that corresponds to the low product alert. The transceiver receives the broadcast transmission and communicates this information to a predetermined phone number. In this respect, the predetermined phone number may also be communicated from the transmitter to the transceiver along with the instruction code. Assuming that the predetermined number corresponds to a central dispatch center, the center answers the phone call placed by the transceiver and receives the instruction code. It then decodes the instruction code to determine that a particular product is low in the vending machine, and it may dispatch an appropriate service person to restock the machine. To this end, the center may be configured to generate an email message to route to an appropriate service person to handle the request. In similar fashion a sensor may detect an out of order condition (one of any number of operational malfunctions). In the same way that a product low message (described above) is communicated to a central station, an operation service condition may be communicated as well. The central station, upon decoding the condition, may dispatch an appropriate service person (instead of a restock person) to service the vending machine.

In accordance with another aspect of the invention, a method is provided for performing an automated service request. In accordance with this aspect of the invention, the method includes the steps of sensing a service condition and notifying a transmitter of the service condition. Then the method transmits an information signal from the transmitter to a remotely-located transceiver, wherein the information signal includes a function code that specifies the service condition. Thereafter, the method places a call from the transceiver to a central station over a phone line comprising a part of the public switched telephone network (PSTN), and communicates at least the function code from the transceiver to the central station. Finally, the method decodes the function code at the central station to identify the service request.

DESCRIPTION OF THE DRAWINGS

The accompanying drawings incorporated in and forming a part of the specification, illustrate several aspects of the present invention, and together with the description serve to explain the principles of the invention. In the drawings:

FIG. 5 is look-up table illustrating the association of instruction codes with there relevant function;

DETAILED DESCRIPTION OF THE PREFERRED EMBODIMENT

Figure 1:
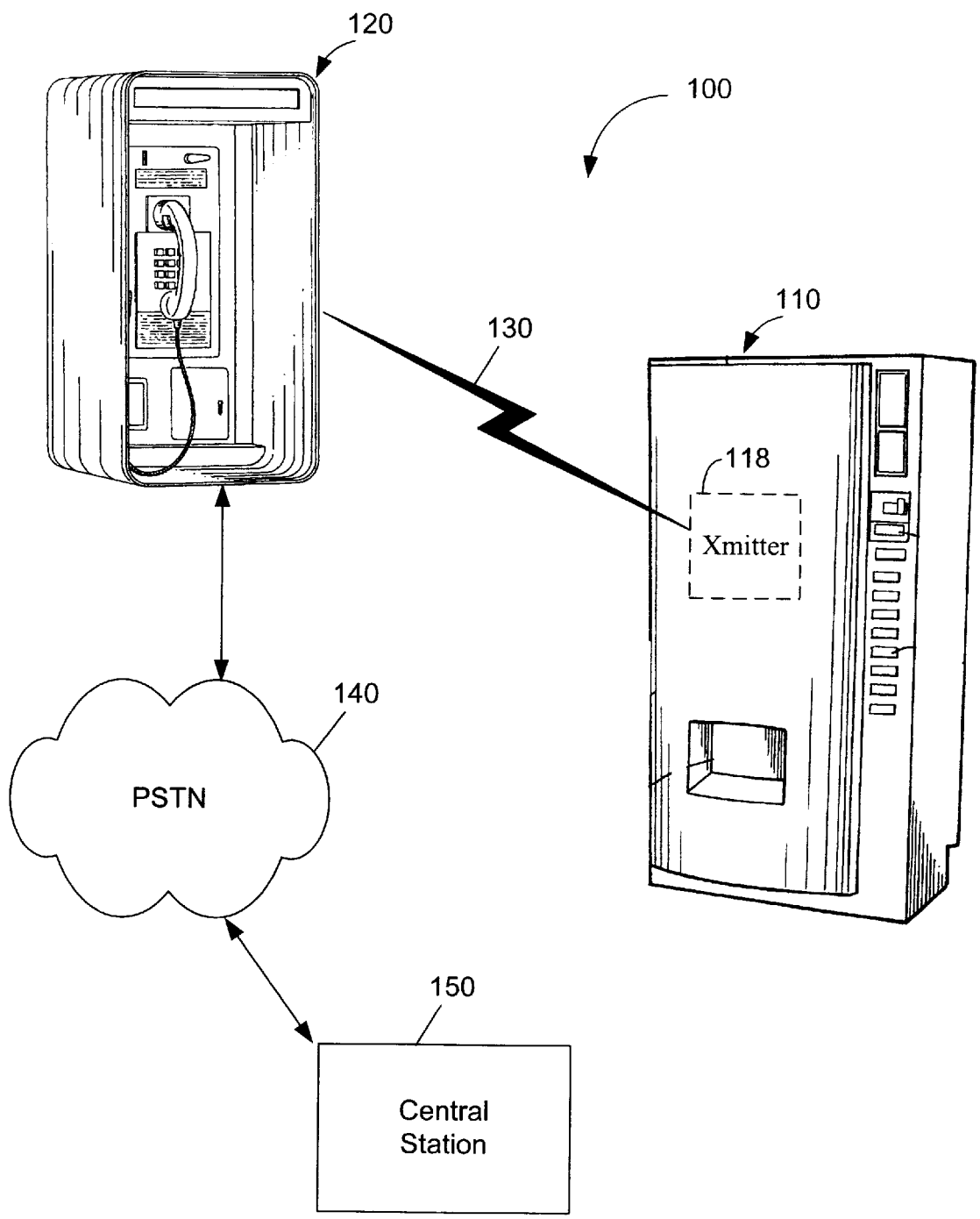
FIG. 1 is a block diagram of a vending machine service request system constructed in accordance with one embodiment of the invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Reference is now made to FIG. 1, which illustrates a typical operational environment 100 of the present invention. Specifically, the environment illustrated is one which provides for the automated service of a vending machine 110. In this regard, a vending machine 110, such as a soda dispensing machine, includes an internal transmitter 118 that communicates information to a nearby transceiver 123 (See FIG. 2). In accordance with this illustrated embodiment, the transceiver 123 is incorporated into a nearby public, pay-type telephone 120. However, and as will be appreciated, the transceiver 123 may be incorporated into a variety of devices, so long as it has access to a phone line, preferably one forming a part of the PSTN 140.

Internally, the transceiver 123 includes receiver circuitry for receiving the transmitted signal 130 and a transmitter for communicating data via the PSTN 140 to a central station 150. In this regard, the central station 150 may be a central dispatch location, that is set up to dispatch service personnel to attend to the vending machine 110. As will be appreciated, the vending machine 110 may encompass a wide variety of devices, in addition to a soda dispensing machine. For example, the vending machine 110 may include a snack dispensing apparatus, a candy dispensing apparatus, a cigarette dispensing apparatus, a newspaper dispensing apparatus, an ice dispensing apparatus, among a laundry list of other devices.

A variety of sensors (15, 117—See FIG. 2) may be provided in the vending machine 110 for detecting a variety of events. For example, detecting whether the machine 110 is low on a given product, or out of a product; determining whether the machine is out of change; determining if the machine has taken in a predetermined amount of money, which should be emptied; detecting if the machine is out of order; etc. These, and other events sensed within the vending machine 110 may be communicated to the transmitter 118, which then formats the data in a way that it may be readily understood by the transceiver 123. The transmitter 118 then transmits the data (preferably via RF link 130) to the transceiver disposed within the telephone 120. This information, in turn, is communicated from the transceiver via PSTN 140 to a central station 150. Based upon the information received, the central station 150 will institute an appropriate response. For example, if the information received is a notification that one or more of the products in the vending machine 110 is either low or out of stock, then a first person may be dispatched to restock the machine. If, on the other hand, the information received is a notification that the machine is out of order, then a second person (service person) may be dispatched to service the machine.

Figure 2:
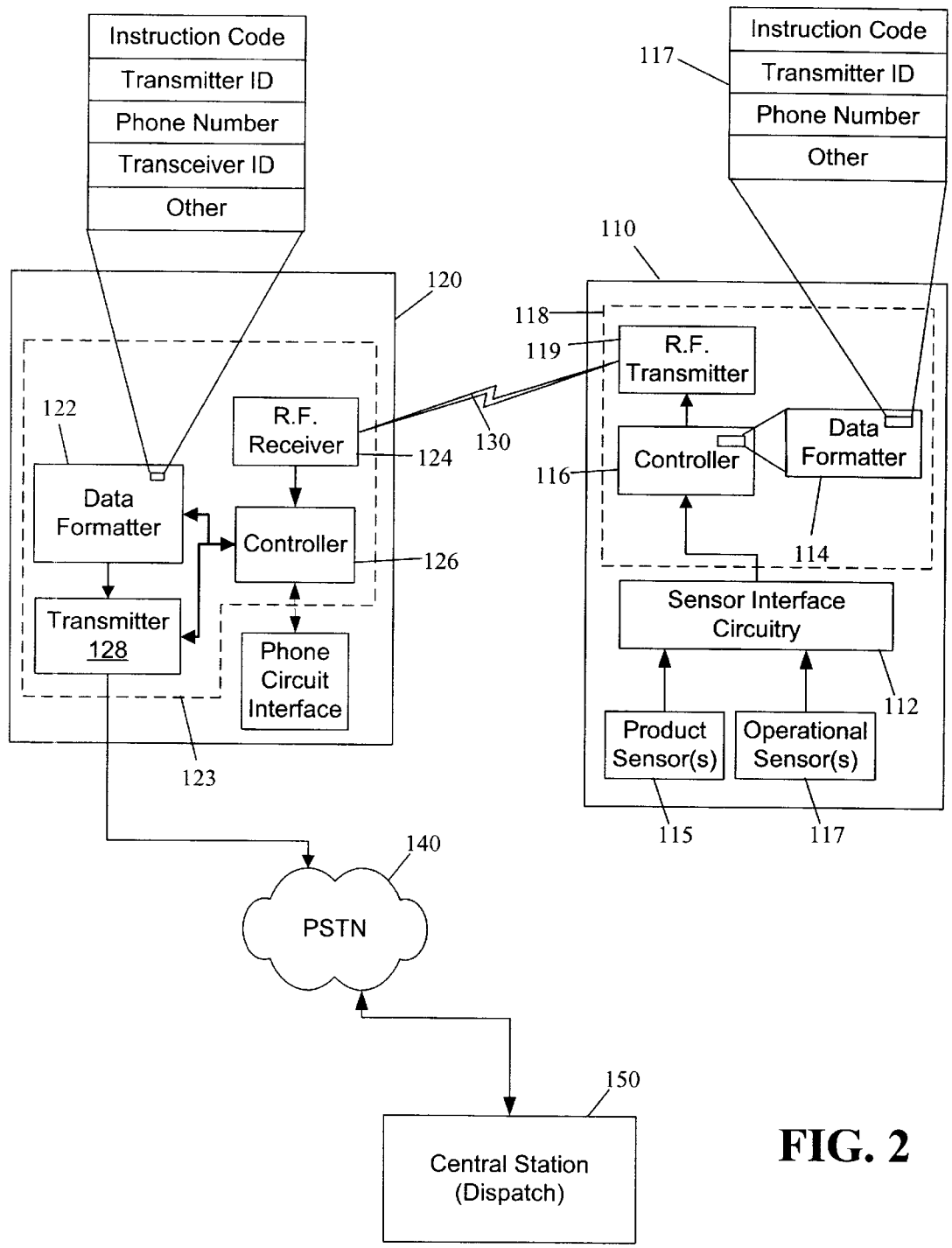
FIG. 2 is a more detailed block diagram of the system illustrated in FIG. 1.

Having broadly described the vending machine service environment, reference is now made to FIG. 2, which illustrates the circuitry within the vending machine 110, as well as the circuitry within the telephone 210, for carrying out the inventive aspects. In this regard, various sensors 115, 117 are disposed within the vending machine 110. These include one or more product sensors 115, which are configured to determine whether a given product is either low or out of stock. The sensors also include operational sensors 117, which are configured to detect machine malfunctions (e.g., out of order conditions) or other conditions relating to the operation of the machine 110. Outputs of the various sensors 115, 117 are directed to an interface circuit 112, which provides an appropriate input to the transmitter 118.

Ultimately, the output of the sensor interface circuitry 112 is directed to a controller 116, which may comprise dedicated circuitry, or may alternatively comprise general purpose programmable hardware, such as a microprocessor or microcontroller. The controller 116, in essence, handles the processing of most of the functional operations carried out at the vending machine 120.

In this regard, and although the invention is not limited to this embodiment, the transceiver 123 of the preferred embodiment is characterized by an open-ended architecture that is configured to receive an encoded instruction. This encoded instruction may be decoded to identify specific and unique functions and/or instructions. For example, one code may uniquely describe the event of the vending machine 110 running out of a certain product. Although this code may be meaningless to the transceiver, when decoded by the central station 150, an appropriate action may be taken. Thus, a first vending machine company may utilize a given code to define a certain event relevant to the vending machine, while a second vending machine enterprise may utilize the same code to define a completely different event. Nevertheless, the same general purpose transceiver may be used to implement both embodiments.

In keeping with a description of the vending machine 110, the controller 116 is preferably configured to receive sensor outputs and compose the appropriate instruction code for transmission to the transceiver. A block called "Data Formatter" 114 may also be provided within the vending machine 110 (illustrated as part of the controller). As the name implies, this block formats the data for transmission to the transceiver. It will be appreciated that, in addition to the instruction code described above, it may also supply other information for transmission. As illustrated by the block 117 (exploded from the Data Formatter block 114), information such as a transmitter identification code, and a destination phone number may also be included in the information transmitted to the transceiver 123. In this regard, the transmitter identification code uniquely identifies the transmitter, which code may be decoded at the central station 150 to identify the specific vending machine that is originating the message. That is, the instruction code may inform the central station 150 as to the particular service need of the vending machine 110, and the transmitter identification code may inform the central station 150 of the particular vending machine 110, and thus its location, in need of service.

Finally, the data formatter 114 may also include the phone number of the central station 150; namely, phone the number that the transceiver 123 is to dial over the PSTN 140. In this way, a generic (open-ended) transceiver 123 may be utilized and installed in mass within public, pay-type telephones, by the service provider. Thus, various companies may then utilize specially configured transmitters 118 to communicate with the general purpose transceiver to communicate a wide variety of information to central locations, defined by the transmitters.

Figure 3:
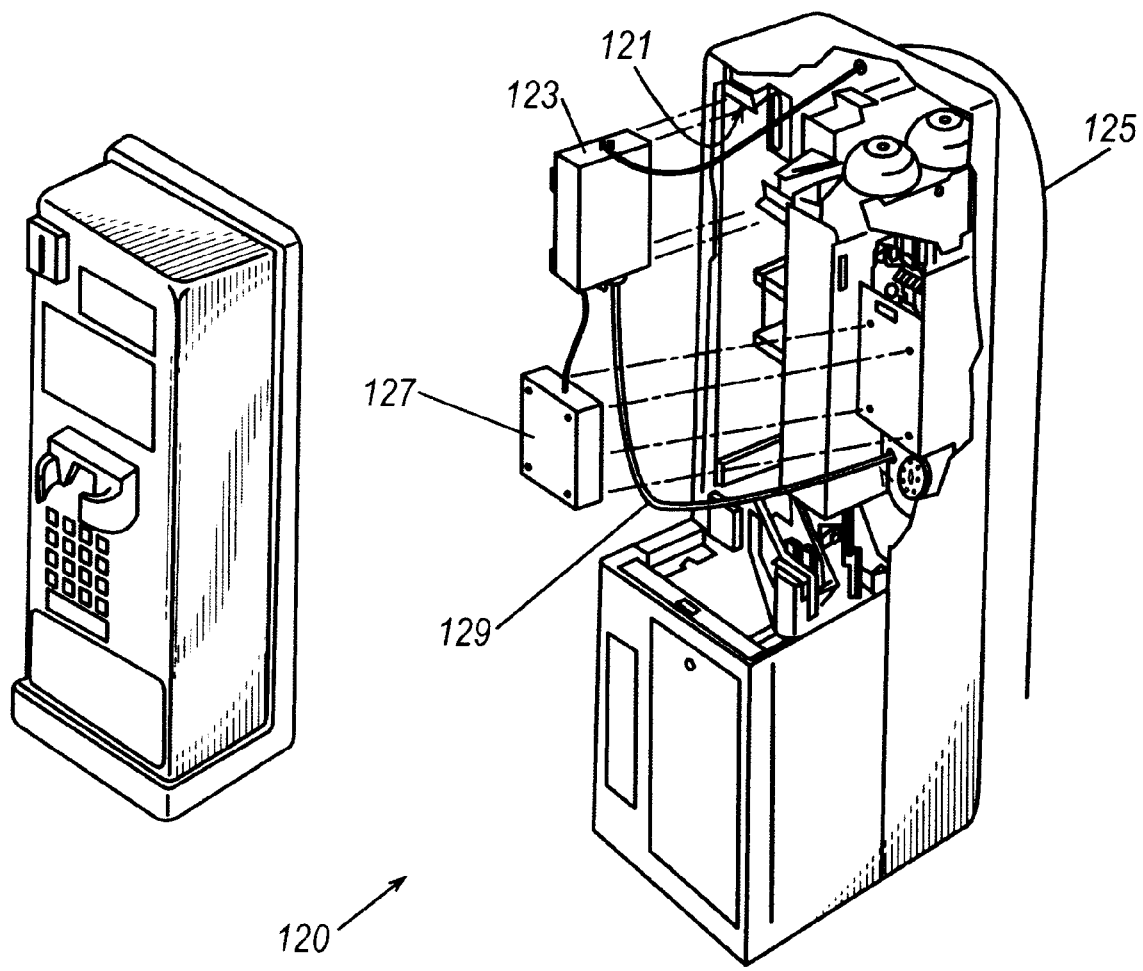
FIG. 3 is an exploded perspective view of a telephone housing a transceiver constructed in accordance with the invention.

Reference is now made briefly to FIG. 3, which is an exploded perspective view of a telephone 120 incorporating a transceiver 123 constructed in accordance with the present invention. In this regard, the transceiver 123 may be provided in a single module having an associated battery pack 127. Alternatively, the transceiver 123 could be designed to operate from the power supplied to the telephone. As illustrated, the module 123 may be configured to snap into a space provided in the telephone, and maintained by a pair of resilient fingers 121.

An external wire 125 may be provided to act as an antenna for the RF receiver 124. Alternatively, a smaller internal antenna may be provided. As will be appreciated by one of ordinary skill in the art, the output from the transceiver is via cable 129, which may terminate at an RJ11 connector, having Ring, Tip, and Common conductors.

Figure 4:
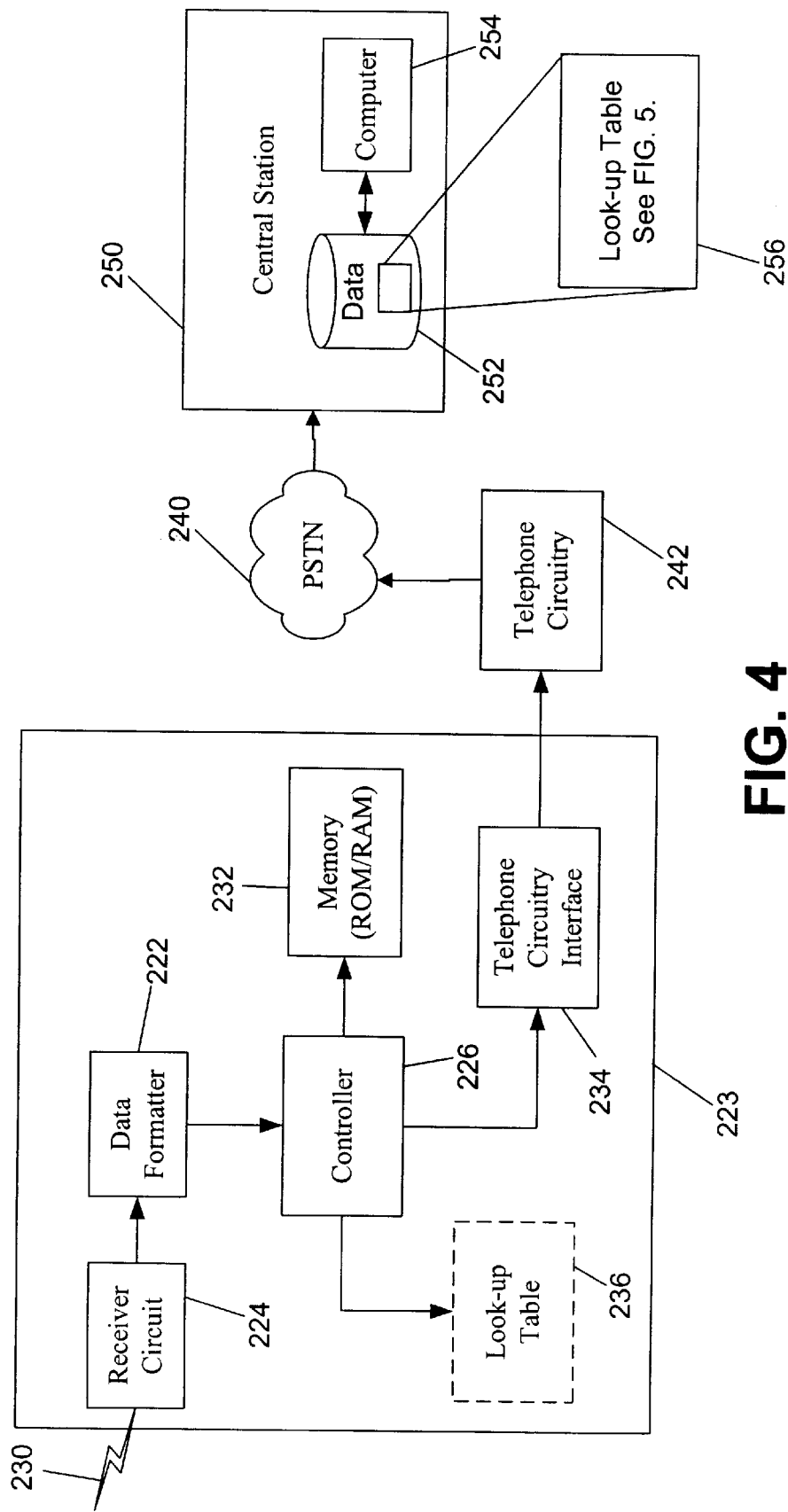
FIG. 4 is a block diagram illustrating a transceiver constructed in accordance with one embodiment of the invention.

Reference is now made to FIG. 4 which illustrates (generically) a portion of a system constructed in accordance with the present invention, particularly illustrating elements of an open-ended transceiver 123. The drawing more specifically illustrates an open-ended transceiver 223 constructed in accordance with the present invention. In this regard, the transceiver 223 includes a receiver circuit 224 that is configured to receive an electromagnetic signal (e.g., RF, optical, etc.). As described above, this signal includes an instruction code, and possibly other items such as a phone number, a transmitter identification code, etc. A data formatter 222 is provided in connection with a controller 226 to further format a signal that is to be output from the transceiver 223 to the central station 250. In this regard, additional information may be added to the signal that is transmitted to the central station 250.

For example, a transceiver identification code may be added to the signal (See FIG. 2). Although the central station 250 may decode the transmitter identification code (if provided) to identify, for example, a geographic location of a transmitter, in environments where the transmitter is mobile (i.e., handheld), a transmitter identification code may be of no use in identifying a geographic location. In such an environment, the addition of a transceiver code will facilitate the identification of the transmitter location (recognizing that the transmitter will be located in the proximity of the transceiver 223).

The controller 226 preferably performs the overall control and synchronization of functional operations within the transceiver 223. In this regard, the controller 226 may be a general purpose microprocessor or microcontroller. If so, a memory 232 will be provided to store programmable code for controlling the operation of the controller 226. Telephone circuitry 234 may also be provided for interfacing to the telephone circuitry 242 within the telephone 120. The telephone 120 typically has circuitry configured to interface with the local loop of the PSTN 240. The interface 234 within the transceiver 223 is designed to interface with this typical/standard telephone circuitry 242. The specific implementation of the circuitry of block 234 will be appreciated by persons skilled in the art and need not be described in detail herein.

A look-up table 236 is also illustrated in FIG. 4. It is illustrated in dashed line to represent that it may be optionally provided within the transceiver 223. Consistent with the broader concepts of the invention, in certain embodiments, it may be desired to provide a more application specific transceiver 223. In such embodiments, a look-up table 236 may be provided within the transceiver for decoding information such as the instruction code, the transmitter identification code, or any other information that may be transmitted from the transmitter. The specific use of such data will necessarily be application specific and controlled by the controller 226, and need not be described herein.

At the central station 250, a computer 254 may be provided to receive and process data received from the transceiver 223 via the PSTN 240. In this regard a database 252, including a look-up table 256, may be provided. It will be appreciated, however, that with a computer 254 implementation, an extremely flexible and robust operation may be achieved. For example, the response of the central station 250 to various incoming messages may be programmed to vary depending upon the contents of the message.

By way of illustration, suppose in incoming message identifies a particular vending machine that is out of a given product. The computer 254, upon recognizing this condition, may alert the appropriate person that is to restock the machine. To this end, the computer may so notify the person by sending the person an email message (See FIG. 6 and related discussion). Similarly, suppose the computer 254 recognizes the incoming message as identifying that a particular vending machine is out of order, then the computer 254 may alert a different person that the machine is in need of technical service. In order to identify the contents of the various incoming messages, the central station 250 may employ a look-up table, like that illustrated in FIG. 5.

Referring to FIG. 5, a look-up table is illustrated. Although the look-up table 256 may take on a wide variety of forms, the table illustrated in FIG. 5 includes two columns of data. The first column is a listing of the various instruction codes that are transmitted by the transmitter to the transceiver 223, and forwarded by the transceiver to the central station 250. The second column contains the specific functions or instructions that correspond to the transmitted/ received instruction code. Thus, by looking up the instruction code within the table 256, the computer 254 at the central station 250 can readily identify the function or instruction that is to be executed. For example, one code may indicated that a particular vending machine "n" is low on a specific product "X". Another code may indicate that a vending machine "m" is out of a specific product "Y". Yet another code may indicate that a vending machine "p" is in need of service.

Thus, in one embodiment, the instruction codes themselves may be encoded to uniquely identify particular vending machines. More particularly, in the illustrated embodiment, instruction code 00000001 identifies that vending machine "n" is low on product "X". In yet another embodiment, this same code may indicate that a vending machine (generally) is low on a product (generally). Additional codes may be generated at the transmitter and decoded at the central station to provide this more specific information. For example, a transmitter identification code may be decoded by the central station 250 to identify the specific vending machine that is low on product. Likewise, an additional code, such as a product code, may be generated by the transmitter to identify the specific product that is low. Thus, in such an alternative embodiment, as many as three different look-up tables may be utilized at the central station 250.

Figure 6:
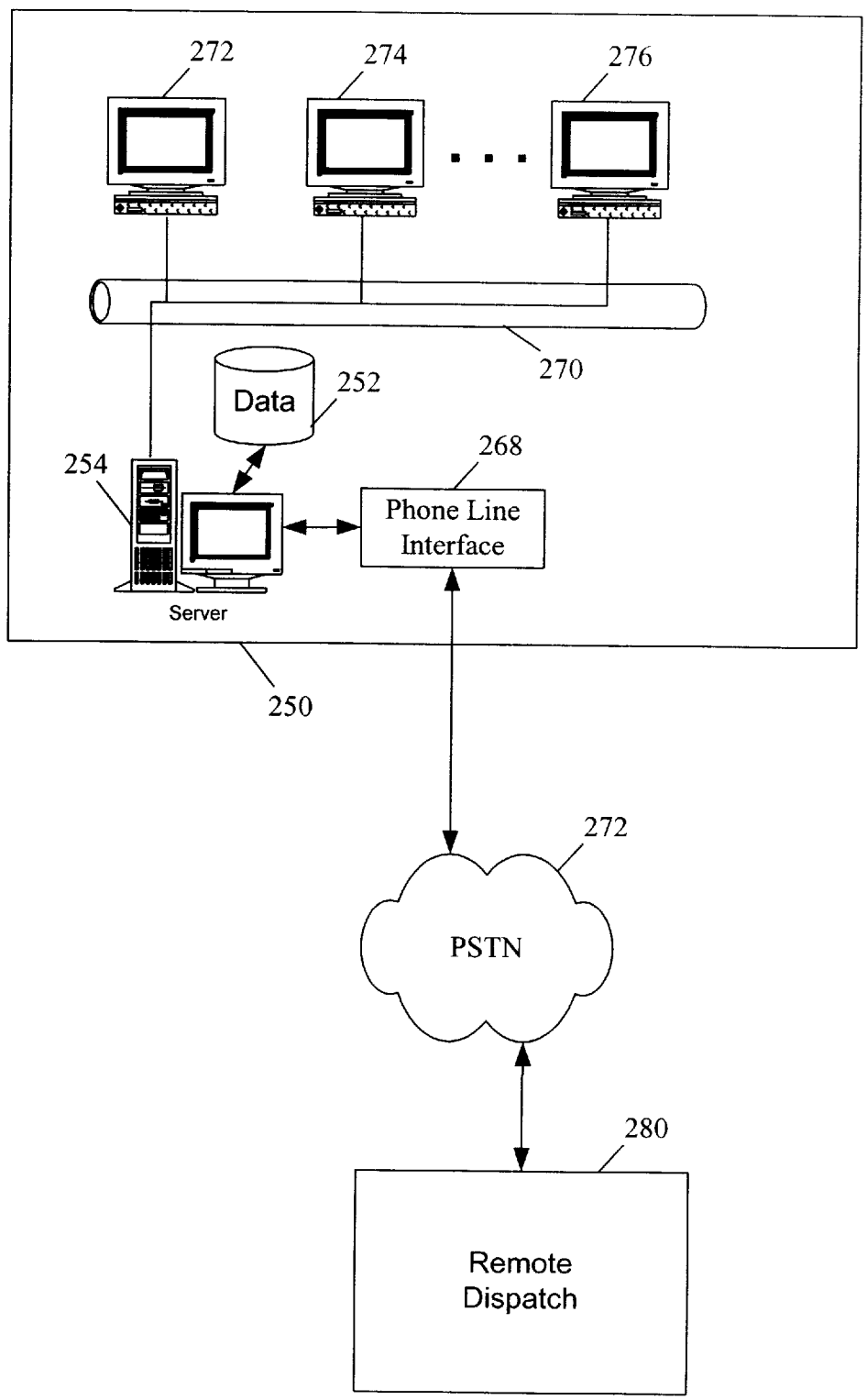
FIG. 6 is a block diagram illustrating a central dispatch station having a computer configured to automatedly respond to incoming service requests.

To more particularly illustrate one central station embodiment, reference is made to FIG. 6, which shows a block diagram of an automated central station 250. More particularly, The central station is illustrated as having a computer 254 configured as a network server. A plurality of workstations 272, 274, and 276 are disposed for communication with the computer 254 via network 270. As is known, the workstations may be conventional desktop computers, having a network card and configured to communicate with a network server in a manner that is well know. The server 254 is also configured to communicate with the PSTN 240 by way of a phone line interface 268. This interface 268 is preferably a modem card that may actually be located internal to the computer 254. Certainly, configurations and communication techniques that allow a computer to communicate across the PSTN 240 are well known and need not be detailed herein. A remote dispatch station 280 is also illustrated in the drawing.

FIG. 6 is provided simply to illustrate the robust operation that may be provided by the system of the present invention. As already described, the central station 250 may be a facility that monitors, stocks, and repairs vending machines. In this regard, it may stand alone (e.g., facility 280 is not needed). Suppose the enterprise is structured such that one person is in charge of stocking vending machines, while another person is in charge of servicing vending machines. Then, when the central station 250 receives a message that the computer 254 decodes to determine that a given vending machine is out of stock (of a given product), the computer 254 may, for example, route an email message (automatically) to a workstation 272 assigned to the person in charge of stocking the vending machine. Alternatively, if the computer 254 decodes a received message to determine that a certain vending machine is out of order, the computer 254 may route an email message to a workstation 274 assigned to a person in charge of servicing the vending machine.

As will be appreciated, the email messages could include a substantial amount of detail. Preferably, this information would include at least the identification of the vending machine in question, as well as the service or stock that is required.

Alternatively, the enterprise may be structured such that one physical site (e.g., station 250) is in charge of service, while another physical site (e.g., remote station 280) is in charge of stocking vending machines. In such an enterprise, if the computer 254 interpreted that an incoming message needed to be routed to a remote station 280, it could handle the request accordingly. In this regard, it could separately establish a connection with the station 280 via the PSTN. Alternatively, it could route an email message to a computer at the remote station 280 via a logical address, using the Internet, in a way that is well known and understood.

Figure 7:
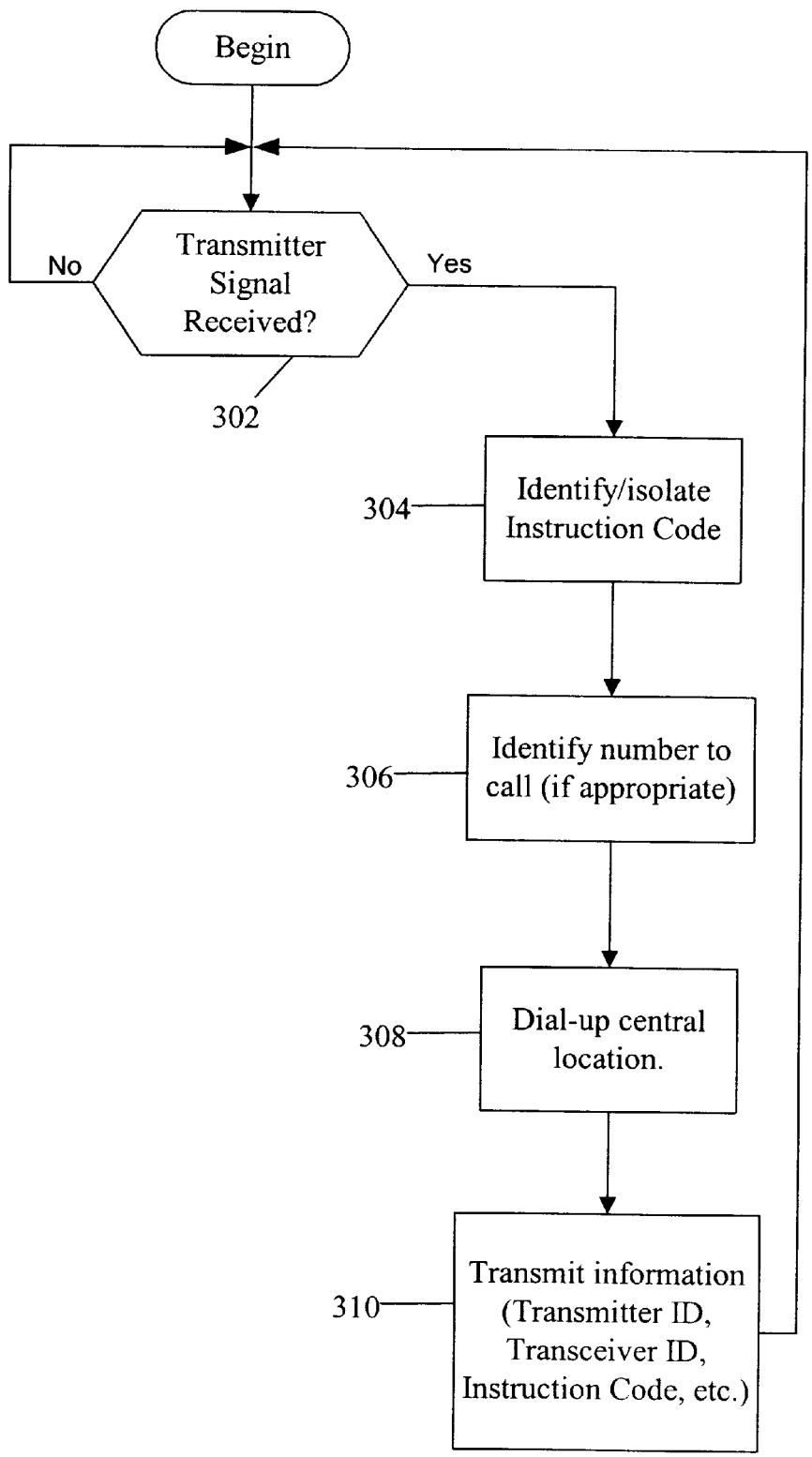
FIG. 7 is a flowchart illustrating the top-level functional operation of a transceiver constructed in accordance with one embodiment of the present invention.

Reference is now made to FIG. 7, which is a flowchart that depicts the top-level functional operation of a transceiver 223 constructed in accordance with one embodiment of the invention. In this regard, the transceiver 223 awaits the receipt of a signal transmitted from a transmitter (step 302). Upon receipt of a transmitted signal, the transceiver (through the controller and data formatter) looks to identify and/or isolate the instruction code (step 304). The transceiver also looks, if appropriate, to identify a phone number of a central station (step 306). The transceiver then dials this central station, establishing a connection over the PSTN (step 308).

In this regard, the transceiver may be configured to seize the phone line. Thus, anyone making a call or any call currently in progress would be disconnected. Alternatively, the transceiver (through the controller) may be configured to test the phone line for its present availability. If a call is in progress, the controller 126 may store the message received from the transmitter and await the availability of the phone line. Once the phone line becomes available, then the transceiver 223 may assume the line and place its call. In yet a further embodiment, the transceiver may be configured to implement simultaneous voice/data technology to place the phone call to the central station without interrupting any ongoing call. In an even more complex embodiment, a different service may be provided in connection with the telephone 120 through which to place the call. For example, the telephone 120 may also be equipped with an ISDN service or a DSL service, through which the transmitted is communicated. As is known, communication through such a service may be made without any interruption to a call ongoing in the POTS frequency band.

Finally, the transceiver transmits the message, including the instruction code, and, if relevant, the transmitter identification code, the destination phone number, the transceiver identification code, etc. (step 320).

Figure 8:
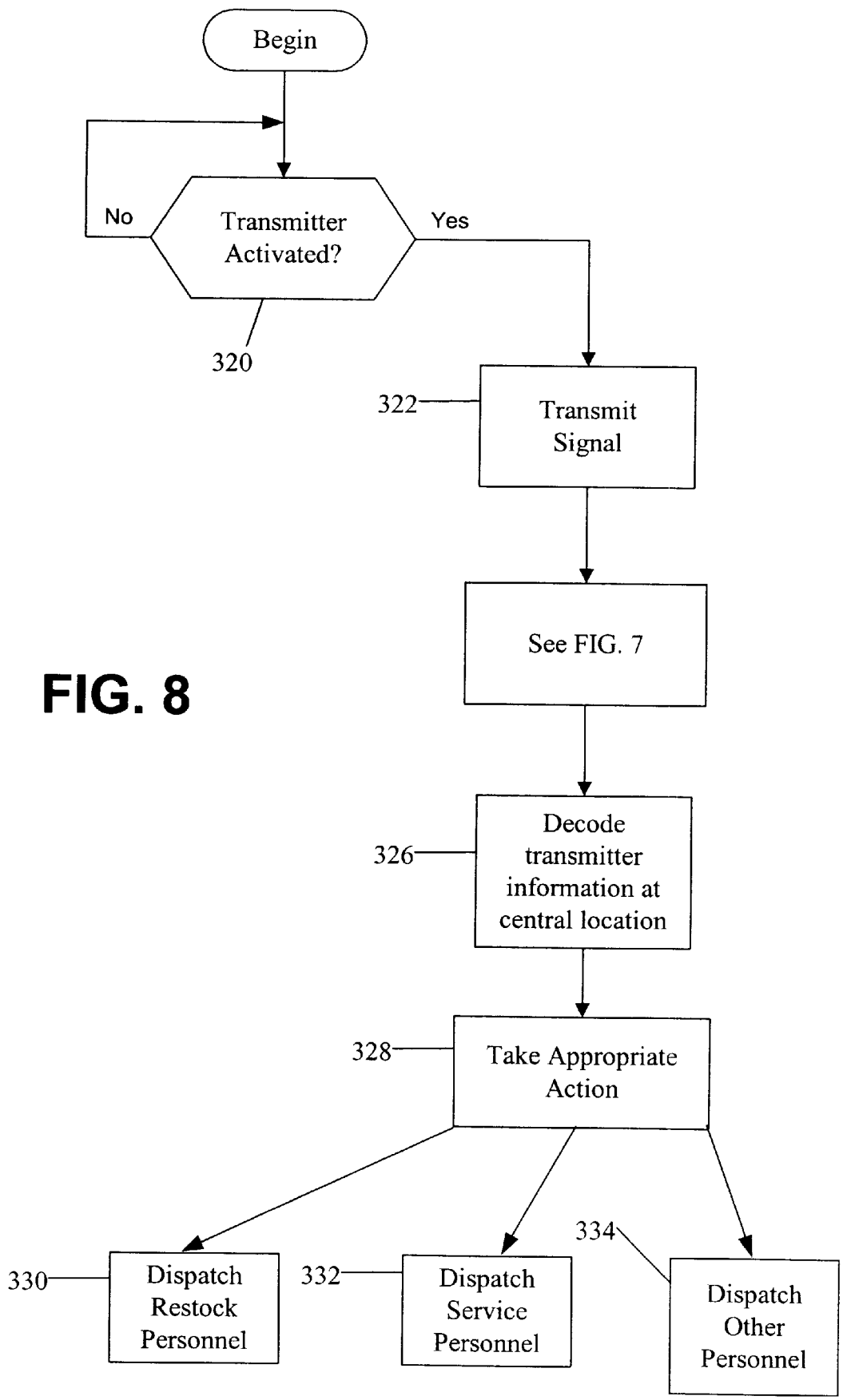
FIG. 8 is a flowchart illustrating the top-level functional operation of a system constructed in accordance with one embodiment of the present invention.

Referring now to FIG. 8, a flowchart is shown that illustrates the top-level functional operation of a system, in accordance with one aspect of the invention. In this regard, the system remains in an idle state, until the transmitter becomes activated (step 310). This activation typically results from a sensor sensing a condition that is to be transmitted to a central station. Upon activation, the transmitter transmits a signal, including at least an instruction code (step 322). Thereafter the transceiver operates in accordance with the flowchart of FIG. 7. The central station then decodes information received via the PSTN (specifically decoding the instruction code).

Based upon the decoded instruction code (and perhaps other codes in some embodiments), the central station initiates an appropriate action in response. For example, in response to a restock call (e.g., a product in a vending machine is either low or out of stock), the central station may dispatch restock personnel (step 330). In response to a service request, the central station may dispatch service personnel 332. In response to other types of messages or requests, the central station may dispatch other personnel or take other appropriate action (step 334).

It should be appreciated that the foregoing description has been presented for purpose of illustration and description. Various alternative embodiments may be implemented completely consistent with the concepts and teachings of the invention. Indeed, the encoded message transmitter 118 is, preferably, different that that described above. In this regard, the message preferably transmitted is, in its most basic form, a fourteen byte message, defined by Table 1 below.

TABLE 1

| Byte | Description |
|---|---|
| 1–4 | "To" Address - Four Hex Bytes |
| 5–8 | "From" Address - Four Hex Bytes |
| 9 | Message Number |
| 10–11 | Packet Number |
| 12 | Byte Count (14–255) |
| 13 | Command (instruction code) |
| 14 | Data |
| 15 | Check Sum - Hex (modulo 8) |

Thus, in the preferred embodiment, the message transmitted defines the destination of the central station by the "To" address, which is a logical IP address. Thus, the transceiver may be configured to establish a connection with a predetermined remote number, which may allow message routing in accordance with the IP protocol, using the Internet. In this regard, bytes 1–4 of the message define the destination to which the message is routed.

When the central station receives the message, it may evaluate the "From" address, which will be unique to a given transmitter. This address, in turn defines the physical (i.e., geographic) location of the transmitter. That is, knowing that a given transmitter was installed on a given vending machine allows the central station 250 to known the location of the transmitter.

Byte 13 defines the command or instruction code that is relayed to the central station. In accordance with the general purpose nature of the system, a second byte (actually variable in size), permits the passage of data if necessary. For example, byte 13 may be encoded to indicate that a given product in a vending machine is low on stock. Further detail, such as a description of the product, may be passed in byte 14. In this regard, byte 14 is actually variable in length. It may vary from 0 to 241 bytes in length. To this end, byte 12 (byte count) will specify the size of the message, which in turn defines the number of bytes in the data field of the message. In the unlikely event that even more information is desired to be transmitted, the protocol defined in Table 1 allows for ready expandability. In this regard bytes 9–11 define a message number and a packet number. Up to 255 messages can be sent in a burst transmission, and up to 65,536 packets may be strung together. In this way, the central station, upon receiving multiple burst transmissions may use the message number and packet number to reconstruct a relatively lengthy message transmission that is broken up over an number of successive transmissions.

Although it is preferred to implement the present invention through an open-ended transmission protocol, as defined above, it will be appreciated that the concepts and teachings of the present invention are not so limited. In fact, for purposes of the present invention, the message transmitted by the transmitter may be as simple as an instruction code that defines a condition of the vending machine, that a central station may decode and act upon. In such an embodiment, the transceiver may be specially configured to establish a phone connection with a predetermined central station.

In yet another embodiment, the transmitter may encode a message that transmits both an instruction code and a phone number that the transceiver is to establish a connection with. Such an embodiment, allows a generic transceiver to be utilized, such that multiple enterprises may utilize this common, generic transceiver for various application. Consistent with these broad concepts, a variety of other configurations may be employed as well.

Indeed, the foregoing description is not intended to be exhaustive or to limit the invention to the precise forms disclosed. Obvious modifications or variations are possible in light of the above teachings. For example, the transceiver has been illustrated herein having a transmitter configured to communicate across the PSTN. However, it will be appreciated that the transmitter may, consistent with the concepts and teachings of the present invention, be similarly configured to communicate via cellular technology as well. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system for requesting service of a vending machine comprising:

at least one product sensor configured to detect a product inventory status:

at least one operational sensor configured to detect an operational condition of the vending machine:

an encode circuit configured to encode a message in response to and based on a predetermined status condition of the at least one production sensor and the at least one operational sensor;

a wireless transmitter configured to transmit a first signal containing the encoded message;

an interface circuit configured to interface the at least one product sensor and the at least one operational sensor to the transmitter;

a transceiver located remotely from the wireless transmitter and configured to receive the first signal, said transceiver including a line interface circuit configured to inter face with a telephone line that is part of the public-switched telephone network (PSTN) and initiate a phone call over the telephone line to a predetermined location, said transceiver further including a controller configured to control the reception of the first signal and a control the communication of a second signal over the telephone line, the second signal containing the encoded message, wherein said transceiver is disposed within a public pay-type telephone; and a central station located remote from said transceiver but being in communication with said transceiver via the PSTN, said central station having an interface to the telephone line configured to receive the second signal, said central station further having an apparatus configured to evaluate the encoded message.

2. The system as defined in claim 1, wherein the first signal further includes a phone number for the transceiver to dial in order to establish connection with the central station.

3. The system as defined in claim 1, wherein the first signal further includes a logic address for the central station.

4. The system as defined in claim 1, wherein the transmitter is a RF transmitter configured to transmit a low-power RF signal.

5. The system as defined in claim 1, wherein the first signal further includes a transmitter identifier code.

6. The system as defined in claim 1, wherein the second signal further includes a transceiver identification code.

7. The system as defined in claim 1, wherein the apparatus includes a look-up table.

8. The system as defined in claim 1, wherein the central station further includes means for notifying service personnel of a service condition, in response to a communication from the transceiver.

9. A method for performing an automated service request comprising the steps of:

disposing sensors within a vending machine to sense a service condition;

sensing a service condition;

transmitting a first signal from a wireless transmitter to a remotely-located transceiver, the first signal including a message encoded based on the service condition;

disposing the transceiver within a public, pay-type telephone;

communication at least the encoded message from the transceiver to the central station via the PSTN; and decoding the encoded message at the central station to identify the service request.

10. The method as defined in claim 9, further including the step of communicating a transceiver identification code from the transceiver to the central station.

11. The method as defined in claim 10, wherein the transceiver identification code is a logical IP address of the transceiver.

12. The method as defined in claim 10, further including the step of evaluating the transceiver identification code at the central station to determine a geographic location of the transceiver.

13. The method as defined in claim 9, wherein the first signal further includes a transmitter identification code.

14. The method as defined in claim 9, wherein the first signal further includes a phone number of the central station.

15. The method as defined in claim 13, wherein the decoding step more specifically includes decoding both the encoded message and the transmitter identification code to identify the service request.

16. The method as defined in claim 13, further including the step of evaluating the transmitter identification code at the central station to determine a geographic location of the transmitter.

17. The method as defined in claim 9, further including the step of initiating a service call in response to the decoding step.

18. A method for performing an automated service request of a vending machine comprising the step of:

transmitting a first signal from a wireless transmitter to a remotely-located transceiver, the first signal including message encoded based on a service condition associated with the vending machine;

disposing the transceiver within a public, pay-type telephone;

establishing a connection between the transceiver and a central station over a phone line comprising a part of the public switched telephone network (PSTN); and communicating the encoded message from the transceiver to the central station.

19. A system for requesting service of a vending machine comprising:

at least one product sensor configured to detect a product inventory status;

at least one operational sensor configured to detect an operational condition of the vending machine;

an encode circuit configured to encode a message in response to and based on a predetermined status condition of the at least one product sensor and the at least one operational sensor, the encoded message including information associated with a destination location;

a wireless transmitter configured to transmit a first signal containing the encoded message;

an interface circuit configured to interface the at least one product sensor and the at least one operational sensor to the transmitter;

a transceiver located remotely from the wireless transmitter and configured to receive the first signal, said transceiver including a line interface circuit configured to interface with a telephone line that is part of the public-switched telephone network (PSTN) and initiate a phone call over the telephone line to a predetermined location, said transceiver further including a controller configured to control the reception of the first signal and to control the communication of a second signal over the telephone line based on the information associated with a destination location, the second signal containing the encoded message wherein said transceiver is disposed within a public, pay-type telephone; and a central station located remote from said transceiver but being in communication with said transceiver via the PSTN, said central station having an interface to the telephone line configured to receive the second signal, said central station further having an apparatus configured to evaluate the encoded message.

20. The system as defined in claim 19, wherein the information associated with a destination location comprises a telephone number corresponding to the central station.

21. The system as defined in claim 19, wherein the information associated with a destination location comprises an IP address corresponding to the central station.

22. A method for performing an automated service request comprising the steps of:

disposing sensors within a vending machine to sense a service condition;

sensing a service condition;

transmitting a first signal from a wireless transmitter to a remotely-located transceiver, the first signal including a message encode based on the service condition, the encoded messaging including information associated with a destination location;

disposing the transceiver within a public, pay-type telephone;

communicating at least the encode message from the transceiver to the central station based on the information associated with a destination location via the PSTN; and decoding the encoded message at the central station to identify the service request.

23. The method as described in claim 22, wherein the information associated with a destination location comprises a telephone number corresponding to the central station.

24. The method as described in claim 23, wherein the information associated with a destination location comprises an IP address corresponding to the central station.

* * * * *